United States Patent
Shin et al.

(10) Patent No.: US 9,358,768 B2
(45) Date of Patent: Jun. 7, 2016

(54) POLARIZING PLATE, METHOD OF PREPARING THE SAME, AND LIQUID CRYSTAL DISPLAY APPARATUS INCLUDING THE SAME

(71) Applicant: CHEIL INDUSTRIES INC., Gumi-si, Gyeongsangbuk-do (KR)

(72) Inventors: Kwang Ho Shin, Uiwang-si (KR); Eun Su Park, Uiwang-si (KR); Dong Yoon Shin, Uiwang-si (KR); Jong Hyuk Eun, Uiwang-si (KR); Hae Ryong Chung, Uiwang-si (KR); Ae Kyoung Kim, Uiwang-si (KR); Han Saem Kang, Uiwang-si (KR); Han Su Kim, Uiwang-si (KR); A Ra Jo, Uiwang-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 4 days.

(21) Appl. No.: 14/108,272

(22) Filed: Dec. 16, 2013

(65) Prior Publication Data

US 2014/0168767 A1 Jun. 19, 2014

(30) Foreign Application Priority Data

Dec. 17, 2012 (KR) .................. 10-2012-0147859
May 30, 2013 (KR) .................. 10-2013-0061564

(51) Int. Cl.
*G02B 5/30* (2006.01)
*B32B 38/00* (2006.01)

(52) U.S. Cl.
CPC .......... *B32B 38/0012* (2013.01); *G02B 5/3083* (2013.01); *B32B 2038/0028* (2013.01); *B32B 2307/42* (2013.01); *B32B 2367/00* (2013.01)

(58) Field of Classification Search
CPC .............. G02B 1/04; G02B 5/30; G02B 5/3025–5/3058; G02B 5/3083; G02B 5/32; G02F 1/133528; G02F 1/13362; G02F 1/13363; G02F 2001/133531; G02F 2001/133543–2001/133548; B32B 38/0012; B32B 2038/0028; B32B 2307/42; B32B 2367/00
USPC .......... 359/485.01, 485.03, 485.05, 359/487.01–487.03, 487.06, 489.01, 359/489.07; 349/96, 102, 117; 427/412.5; 428/1.31
See application file for complete search history.

(56) References Cited

U.S. PATENT DOCUMENTS 4,592,623 A 6/1986 Yamamoto et al.
6,542,300 B2* 4/2003 Umemoto ................ 359/487.02
(Continued)

FOREIGN PATENT DOCUMENTS

CN 1491370 A 4/2004
CN 101852881 A 10/2010
(Continued)

OTHER PUBLICATIONS

Murakami et al., WO 2012/077663, Jun. 14, 2012, https://patentscope.wipo.int, English Machine Translation, accessed Oct. 19, 2015.*
(Continued)

*Primary Examiner* — Derek S Chapel
*Assistant Examiner* — Adam W Booher
(74) *Attorney, Agent, or Firm* — Lewis Roca Rothgerber Christie LLP (57) ABSTRACT

A polarizing plate, a method of preparing the same and a liquid crystal display apparatus including the same are disclosed. The polarizing plate includes a polarizer and a polyester film formed on a surface of the polarizer, wherein the polyester film has a ratio of an elongation ratio in a machine direction to an elongation ratio in a transverse direction of about 1:0.8 to about 1:1.2, an in-plane retardation (Re) of about 500 nm or less at a wavelength of 550 nm, and an out-of-plane retardation (Rth) of about 10,000 nm or less at a wavelength of 550 nm.

14 Claims, 2 Drawing Sheets

(56) References Cited

U.S. PATENT DOCUMENTS

| | | |
|---|---|---|
| 8,243,239 B2 | 8/2012 | Choi et al. |
| 2002/0075564 A1 | 6/2002 | Umemoto |
| 2004/0239852 A1* | 12/2004 | Ono et al. ............... 349/118 |
| 2005/0046074 A1 | 3/2005 | Tasaka et al. |
| 2007/0116898 A1 | 5/2007 | Kuzuhara et al. |
| 2008/0266500 A1* | 10/2008 | Nimura ............ G02F 1/133634 349/117 |
| 2010/0165262 A1 | 7/2010 | Nagase et al. |
| 2011/0170041 A1* | 7/2011 | Sakai ............................ 349/96 |
| 2014/0098325 A1 | 4/2014 | Murata et al. |

FOREIGN PATENT DOCUMENTS

| | | | |
|---|---|---|---|
| CN | 102124401 A | 7/2011 | |
| JP | 2002-331576 A | 11/2002 | |
| JP | 2002331576 A | * 11/2002 | |
| JP | 2012-501464 A | 1/2012 | |
| KR | 10-2007-0099009 | 10/2007 | |
| KR | 10-2009-0096405 A | 9/2009 | |
| KR | 10-2011-0074208 A | 6/2011 | |
| KR | 10-2012-0125389 | 11/2012 | |
| TW | I228620 B | 3/2005 | |
| WO | WO2012077663 | * 6/2012 | ............... G02B 5/30 |
| WO | WO 2012/157663 A1 | 11/2012 | |

OTHER PUBLICATIONS

Taiwan Patent Office action dated Jun. 12, 2015 in corresponding TW Application No. 102146377, 3 pages.
Korean Office action for Patent Application No. 10-2012-0147859, dated Jan. 19, 2015, 4 pages.
Chinese Office Action, issued in Patent Application No. 201310693574.7, dated Aug. 27, 2015, 8 pages.
Korean Office Action dated Aug. 17, 2015 of the corresponding Korean Patent Application No. 10-2013-0061564, (6 pages).
KIPO Office action dated Nov. 6, 2015 issued in priority KR application No. 10-2012-0147859, with English translation, 7 pages.

* cited by examiner

POLARIZING PLATE, METHOD OF PREPARING THE SAME, AND LIQUID CRYSTAL DISPLAY APPARATUS INCLUDING THE SAME

CROSS-REFERENCE TO RELATED APPLICATIONS

This application claims priority to and the benefit of Korean Patent Application No. 10-2012-0147859, filed on Dec. 17, 2012 in the Korean Intellectual Property Office (KIPO); and Korean Patent Application 10-2013-0061564, filed on May 30, 2013 in the Korean Intellectual Property Office (KIPO), the entire contents of each of which are incorporated herein by reference.

BACKGROUND

1. Technical Field

Aspects according to embodiments of the present invention relate to a polarizing plate, a method of preparing the same and a liquid crystal display apparatus including the same.

2. Description of the Related Art

Polarizing plates are used to control a direction of oscillation of light in order to visualize display patterns of a liquid crystal display apparatus inside and outside of a liquid crystal cell. Although liquid crystal display apparatuses were initially used in small apparatuses, liquid crystal display apparatuses have recently been used in a wide range of applications, including notebook computers, liquid crystal monitors, liquid crystal color projectors, liquid crystal televisions, navigation systems for vehicles, personal phones, measurement instruments used indoors and outdoors, and the like. For example, liquid crystal monitors and liquid crystal televisions generally employ a high-brightness backlight unit. Thus, a polarizing film included in the polarizing plate should exhibit high performance. The polarizing plate includes a polarizer, and a protective film on one surface of the polarizer for protecting the polarizer. Typically, the protective film is a triacetyl cellulose (TAC) film, which is more expensive than typical polymer films. Therefore, low-priced polymer films including polyethylene terephthalate (PET) films are often used to replace the TAC film. The PET films, however, have high phase difference due to high-magnification elongation for improvement of yield. Moreover, a liquid crystal display apparatus including the PET film can exhibit front and lateral rainbow spots, causing deterioration in image quality.

SUMMARY

In accordance with one aspect according to an embodiment of the present invention, a polarizing plate may include: a polarizer; and a polyester film formed on a first surface (e.g., an upper surface) of the polarizer, where the polyester film has a ratio of elongation ratio in a machine direction to elongation ratio in a transverse direction (i.e., elongation ratio in a machine direction:elongation ratio in a transverse direction) of about 1:0.8 to about 1:1.2, an in-plane retardation (Re) of about 500 nm or less at a wavelength of 550 nm (as calculated by Equation 1), and an out-of-plane retardation (Rth) of about 10,000 nm or less at a wavelength of 550 nm (as calculated by Equation 2).

$$Re = (nx - ny) \times d \quad \text{Equation 1}$$

$$Rth = ((nx + ny)/2 - nz) \times d \quad \text{Equation 2}$$

In Equations 1 and 2, nx, ny, nz and d are defined as in the following detailed description.

In accordance with another aspect of an embodiment of the present invention, a method of preparing a polarizing plate may include: preparing a polyester film by concurrent (or simultaneous) elongation of a melt-extruded polyester resin in machine and transverse direction's in a ratio of an elongation ratio in the machine direction to an elongation ratio in the transverse direction (i.e., elongation ratio in a machine direction:elongation ratio in a transverse direction) of about 1:0.8 to about 1:1.2; and bonding the polyester film to a first surface (e.g., an upper surface) of a polarizer.

In accordance with a further aspect of an embodiment of the present invention, a liquid crystal display apparatus may include the polarizing plate.

BRIEF DESCRIPTION OF THE DRAWINGS

The above and other aspects, features and advantages of embodiments of the invention will become apparent with reference to the following detailed description when considered together with the accompanying drawings, in which.

DETAILED DESCRIPTION

Certain embodiments of the present invention will be described in detail with reference to the accompanying drawings, by way of illustration. It will be understood that the present invention may be modified in different ways and should not be construed as being limited to the following embodiments. In the drawings, portions irrelevant to the description are omitted for clarity. Like components are denoted by like reference numerals throughout the specification. As used herein, terms such as "upper side" and "lower side" are defined with reference to the accompanying drawings, but are not limited thereto. Thus, it will be understood that the term "upper side" can be used interchangeably with the term "lower side". As used herein, a "lateral side" may have a viewing angle of 0° to less than 90° and/or greater than 90° to 180° in upper/lower/left/right directions. As used herein, when the polyester film is elongated in a longitudinal direction, the term "elongation ratio" refers to a ratio of the length of a polyester film after elongation to the initial length of the polyester film. Similarly, when the polyester film is elongated in a width direction, the term "elongation ratio" refers to a ratio of the width of the polyester film after elongation to the initial width of the polyester film. As used herein, with respect to an axis distortion, "+" refers to a clockwise direction with respect to a reference axis, and "−" refers to a counterclockwise direction with respect to the reference axis, and the reference axis is the absorption axis of the polarizer. Also, in the context of the present application, when a first element is referred to as being "on" a second element, it can be directly on the second element or be indirectly on the second element with one or more intervening elements therebetween.

Figure 1:
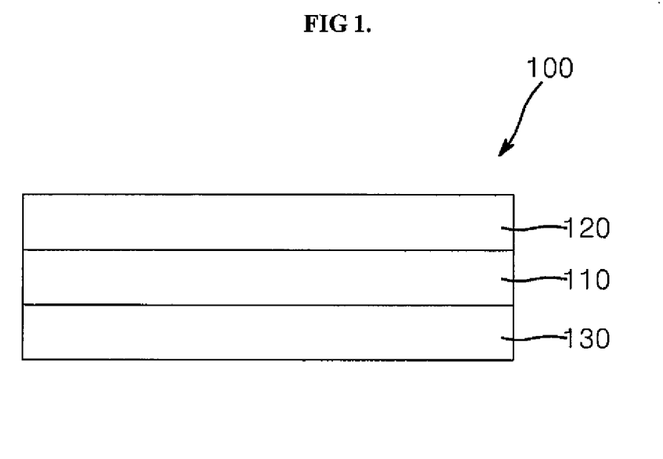
FIG. 1 is a cross-sectional view of a polarizing plate according to one embodiment of the present invention.

Hereinafter, a polarizing plate according to one embodiment of the present invention will be described with reference to FIG. 1. FIG. 1 is a cross-sectional view of a polarizing plate according to one embodiment of the present invention.

Referring to FIG. 1, a polarizing plate 100 according to one embodiment of the invention may include: a polarizer 110; a polyester film 120 on (or formed on) a first surface (e.g., an upper surface) of the polarizer 110; and an optical film 130 on (or formed on) a second surface (e.g., a lower surface) of the polarizer 110.

The polyester film 120 is a biaxially elongated film, for example, a film concurrently (e.g., simultaneously) elongated in an MD (machine direction) and a TD (transverse direction). The polyester film 120 may have a ratio of elongation ratio in the machine direction to elongation ratio in the transverse direction of about 1:0.8 to about 1:1.2, for example, about 1:1. If the ratio of elongation ratio in the transverse direction to elongation ratio in the machine direction is less than 0.8 and/or greater than 1.2, the polarizing plate can exhibit rainbow spots because of high in-plane retardation (Re) of the polyester film.

In one embodiment, the polyester film may have a ratio of elongation ratio in the machine direction to elongation ratio in the transverse direction of about 1:0.85 to about 1:1.15, about 1:0.9 to about 1:1.1, about 1:0.95 to about 1:1.05, about 1:0.96 to about 1:1.04, about 1:0.97 to about 1:1.03, about 1:0.98 to about 1:1.02, about 1:0.99 to about 1:1.01, about 1:0.99 to about 1:1, about 1:0.85 to about 1:1.09, about 1:0.85 to about 1:1.08, or about 1:0.85 to about 1:1.07.

In one embodiment, the polyester film may have an elongation ratio in the machine direction of about 1.0 to about 4.0, for example, about 2.5 to about 3.5, or, for example, about 2.5, 2.6, 2.7, 2.8, 2.9, 3.0, 3.1, 3.2, 3.3, 3.4, or 3.5, and an elongation ratio in the transverse direction of about 1.0 to about 4.0, for example, about 2.5 to about 3.5, or, for example, about 2.5, 2.6, 2.7, 2.8, 2.9, 3.0, 3.1, 3.2, 3.3, 3.4, or 3.5. Within any of the foregoing ranges, the polarizing plate does not exhibit front and lateral rainbow spots (or an amount or likelihood of such spots is reduced) when the polyester film is used therein, because the elongation ratio in the machine direction is substantially the same as the elongation ratio in the transverse direction.

The polyester film 120 has low phase difference due to the concurrent (or simultaneous) elongation and having substantially the same elongation ratios in the machine and transverse directions. As such, the polyester film 120 can prevent the polarizing plate from exhibiting front and lateral rainbow spots (or reduce an amount or likelihood of such spots). In one embodiment, the polyester film 120 may have an in-plane retardation (Re) of about 500 nm or less at a wavelength of 550 nm (as calculated by Equation 1 below), and an out-of-plane retardation (Rth) of about 10,000 nm or less at a wavelength of 550 nm (as calculated by Equation 2 below).

$$Re = (nx-ny) \times d \qquad \text{Equation 1}$$

$$Rth = ((nx+ny)/2 - nz) \times d \qquad \text{Equation 2}$$

In Equations 1 and 2, nx, ny and nz are refractive indices in the x-, y- and z-axis directions (respectively) of the polyester film at a wavelength of 550 nm, and d is a thickness of the polyester film (unit: nm).

Within any of the foregoing ranges of Re and Rth, the polarizing plate does not exhibit front and lateral rainbow spots (or an amount or likelihood of such spots is reduced), and allows a liquid crystal display panel to exhibit good optical properties when the polarizing plate is applied thereto. For example, the polyester film has an Re at a wavelength of 550 nm of about 0 nm to about 500 nm, about 0 nm to about 400 nm, about 0 nm to about 200 nm, or, for example, about 0, 10, 20, 30, 40, 50, 60, 70, 80, 90, 100, 110, 120, 130, 140, 150, 160, 170, 180, 190, 200, 210, 220, 230, 240, 250, 260, 270, 280, 290, 300, 310, 320, 330, 340, 350, 360, 370, 380, 390, 400, 410, 420, 430, 440, 450, 460, 470, 480, 490 or 500 nm. Here, as Re approaches 0, the polyester film has better quality. The polyester film has an Rth at a wavelength of 550 nm of about 0 nm to about 10,000 nm, about 0 nm to about 4,000 nm, about 3,000 nm to about 10,000 nm, or, for example, about 100, 200, 300, 400, 500, 600, 700, 800, 900, 1000, 1100, 1200, 1300, 1400, 1500, 1600, 1700, 1800, 1900, 2000, 2100, 2200, 2300, 2400, 2500, 2600, 2700, 2800, 2900, 3000, 3100, 3200, 3300, 3400, 3500, 3600, 3700, 3800, 3900, 4000, 4100, 4200, 4300, 4400, 4500, 4600, 4700, 4800, 4900, 5000, 5100, 5200, 5300, 5400, 5500, 5600, 5700, 5800, 5900, 6000, 6100, 6200, 6300, 6400, 6500, 6600, 6700, 6800, 6900, 7000, 7100, 7200, 7300, 7400, 7500, 7600, 7700, 7800, 7900, 8000, 8100, 8200, 8300, 8400, 8500, 8600, 8700, 8800, 8900, 9000, 9100, 9200, 9300, 9400, 9500, 9600, 9700, 9800, or 9900 nm.

The polyester film 120 has a degree of biaxiality (NZ) at a wavelength of 550 nm of about 1 or more, or about 15 or more, example, 15 to $10^{10000}$), or about 50 or more (for example, from 50 to $10^{10000}$). NZ is calculated using Equation 3 below and does not have an upper limit.

$$NZ = (nx-nz)/(nx-ny) \qquad \text{Equation 3}$$

In Equation 3, nx, ny and nz are the refractive indices in the x-, y- and z-axis directions (respectively) of the polyester film at a wavelength of 550 nm.

Within any of the foregoing ranges, the polyester film allows a liquid crystal display apparatus to exhibit good (or ideal) image quality, and the polyester film does not exhibit rainbow spots (or an amount or likelihood of such spots is reduced). In the polyester film, the x-axis direction, y-axis direction, and z-axis direction correspond to the machine direction, the transverse direction, and a thickness direction of the polyester film, respectively.

At a wavelength of 550 nm, the polyester film 120 has nx≈ny and a difference of nx-ny is equal to about 0 to about 0.1, about 0 to about 0.01, or, for example, about 0.001, 0.002, 0.003, 0.004, 0.005, 0.006, 0.007, 0.008, 0.009 or 0.01. Here, as the difference of nx-ny approaches about 0, the polyester film has better quality. Thus, the NZ of the polyester film may have no upper limit (e.g., the difference of nz-ny may be infinitesimally small or zero, such that NZ may have no limit). Within any of the foregoing ranges, the polarizing plate including the polyester film as a protective film does not exhibit front and lateral rainbow spots due to small changes in phase difference depending on the angle and wavelength of incident light (or an amount or likelihood of such spots is reduced).

Because the polyester film 120 is non-birefringent, for example, free from birefringence (or substantially free from birefringence), the polarizing plate including the polyester film as a protective film does not exhibit front and lateral rainbow spots due to small changes in phase difference depending on the angle and wavelength of incident light (or an amount or likelihood of such spots is reduced).

The polyester film 120 may be any suitable transparent film including (or formed of) a polyester resin, without limitation. In one embodiment, the polyester film may be a film including (e.g., formed of) polyethylene terephthalate, polybutylene terephthalate, polyethylene naphthalate, and/or polybutylene naphthalate resins, but the polyester film is not limited thereto.

The polyester film 120 may have a thickness of about 5 μm to about 500 μm. Within this range, the polyester film can be more easily applied to the polarizing plate when stacked on the polarizer. For example, the polyester film may have a thickness of about 5 μm to about 200 μm, for example, about 5 μm to about 115 μm.

The polyester film 120 may have a haze value of less than about 2%, for example, less than about 1%, for example, about 0.1% to about 1.9% or about 0.1% to about 0.9%. Despite a low haze value of less than about 2%, the polyester film according to embodiments of the invention can substantially prevent the polarizing plate from exhibiting rainbow spots due to a low phase difference thereof (or reduce an amount or likelihood of such spots).

The polyester film 120 may further include a functional coating layer on a surface (e.g. an upper surface) thereof to impart functionality. For example, a hard coating layer, an anti-reflective layer or an anti-fingerprint layer may be on the upper surface of the polyester film 120. The functional coating layer may have a thickness of 1 μm to 100 μm. Within this range, the polyester film can be more easily applied to the polarizing plate when stacked on the polarizer.

In addition, the polyester film 120 may further include a surface coating layer on another surface (e.g., a lower surface) thereof. In some embodiments, the polyester film has a hydrophobic surface. For example, when a polyethylene terephthalate film is used as a protective film, the protective film exhibits higher hydrophobicity. To apply such a film to the polarizing plate, the film is subjected to surface modification to convert a surface thereof from a hydrophobic surface to a hydrophilic surface. When sodium hydroxide (which is used with existing cellulose films) is used for surface modification of the protective film, the surface of the protective film can be insufficiently modified or can be damaged. To address such problems, a surface coating layer including a primer having hydrophobic and hydrophilic functional groups may be on (or formed on) the protective film. The primer having hydrophobic and hydrophilic functional groups may include polyester resins, polyvinyl acetate resins, or mixtures thereof, but the primer is not limited thereto. The mechanical properties and low water vapor permeability of the protective film are improved through the addition of the surface coating layer, thereby imparting high resistance to severe external (e.g., environmental) conditions to the polarizing plate. In addition, the surface coating layer may be between (or formed between) the protective film and the polarizing plate to improve adhesion between the protective film and the polarizer.

Because the polarizer 110 has features (e.g., molecules or polymers) aligned in a set (or a specific) direction, the polarizer transmits light of a set (or a specific) direction when mounted on the liquid crystal display apparatus. The polarizer may be prepared by dyeing a polyvinyl alcohol film with iodine or a dichroic dye, followed by elongation in a set (or a certain) direction, but the polarizer is not limited thereto. For example, in some embodiments, the polarizer is prepared through processes of swelling, dyeing, elongation, and cross-linking. Each process may be performed by any suitable method commonly used in the art.

The polarizer 110 may have a thickness of about 10 μm to about 30 μm. Within this range, the polarizer can be more easily applied to the polarizing plate for a liquid crystal display apparatus.

The optical film 130 is bonded to a liquid crystal display panel via an adhesive, and the optical film 130 may be a retardation film, which has a predetermined (or set) range of phase difference and compensates for viewing angle. In one embodiment, the optical film has an in-plane phase difference (Ro) at a wavelength of 550 nm of about 30 nm to about 60 nm, for example, about 30, 31, 32, 33, 34, 35, 36, 37, 38, 39, 40, 41, 42, 43, 44, 45, 46, 47, 48, 49, 50, 51, 52, 53, 54, 55, 56, 57, 58, 59 or 60 nm. Within any of the foregoing ranges, the optical film can compensate for birefringence generated by a liquid crystal cell when light passes through the liquid crystal cell, and thereby widens the viewing angle and provides black and white compensation.

In some embodiments, the optical film 130 is a transparent optical film, and may be a polyester film or a non-polyester film that does not include polyester, but the optical film is not limited thereto. For example, the optical film may include (e.g., be formed of) at least one resin selected from celluloses (including triacetyl cellulose and the like), polyesters (including polyethylene terephthalate, polybutylene terephthalate, polyethylene naphthalate, polybutylene naphthalate and the like), cyclic polyolefins, polycarbonates, polyether sulfones, polysulfones, polyamides, polyimides, polyolefins, polyacrylates, polyvinyl alcohols, polyvinyl chloride, and polyvinylidene chlorides, but the optical film is not limited thereto.

The optical film 130 may have a thickness of about 10 μm to about 500 μm. Within this range, the optical film can be more easily applied to the polarizing plate for a liquid crystal display apparatus.

The polarizing plate may further include bonding layers between the polarizer 110 and the polyester film 120 and/or between the polarizer 110 and the optical film 130 to improve mechanical strength. The bonding layer may include typical bonding agents, for example, water-based bonding agents, pressure-sensitive bonding agents, and/or photocurable bonding agents, but the bonding agents are not limited thereto.

In addition, the optical film 130 may be stacked on a liquid crystal display panel via an adhesive layer. The adhesive layer may include (e.g., be formed of) an adhesive exhibiting transparency, durability, reworkability and the like, which are advantageous (or required) for adhesives of optical films. For example, the adhesive layer may include a (meth)acrylic copolymer as an adhesive resin, but the adhesive layer is not limited thereto. As used herein, the term "(meth)acrylic copolymer" includes acrylic copolymers, methacrylic copolymers, and acrylic-methacrylic copolymers.

The polarizing plate 100 may have a thickness of about 25 μm to about 500 μm. Within this range, the polarizing plate can be more easily applied to the liquid crystal display apparatus. The polarizing plate may have a degree of polarization of about 99% or greater, for example, about 99.9% to about 99.999%, and a transmittance of about 40% or greater, for example, about 40% to about 80%. Within any of the foregoing ranges, when the polarizing plate is mounted on the liquid crystal display apparatus, the liquid crystal display apparatus does not exhibit deterioration in optical properties (or an amount or likelihood of deterioration of optical properties is reduced).

Figure 2:
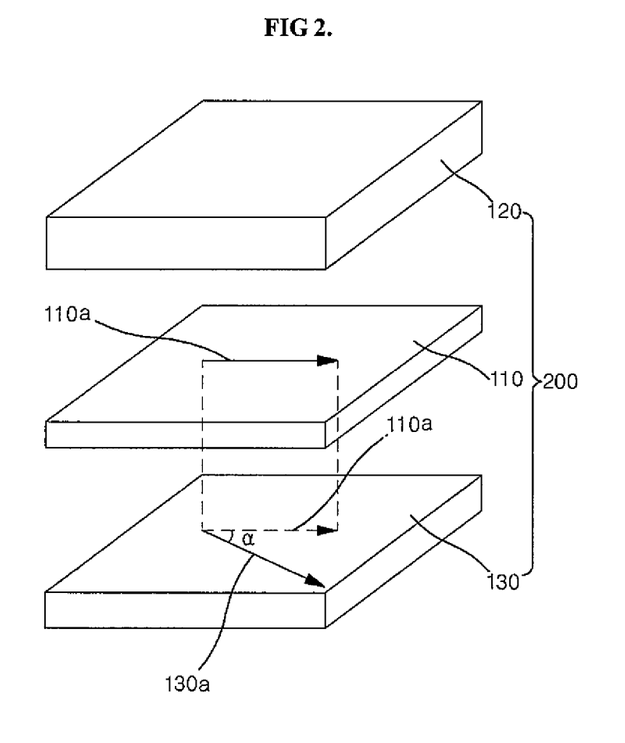
FIG. 2 is an exploded perspective view of a polarizing plate according to another embodiment of the present invention.

Hereinafter, a polarizing plate according to another embodiment of the invention will be described with reference to FIG. 2. FIG. 2 is an exploded perspective view of a polarizing plate according to another embodiment of the present invention.

Referring to FIG. 2, a polarizing plate 200 according to another embodiment of the invention may include: a polarizer 110; a polyester film 120 on (or formed on) a first surface (e.g., an upper surface) of the polarizer 110; and an optical film 130 on (or formed on) a second surface (e.g., a lower surface) of the polarizer 110. The optical film 130 may have an angle (α) of axis distortion of the fast axis 130a of the optical film with respect to the absorption axis 110a of the polarizer 110 of about +0.03° or greater and less than about +0.2°. The polarizing plate 200 is substantially the same as the polarizing plate described above, except that the optical film has an angle (α) of axis distortion of the fast axis 130a of the optical film with respect to the absorption axis 110a of the polarizer of about +0.03° or greater and less than about +0.2°. Axis distortion will be described in more detail below.

Referring to FIG. 2, the optical film 130 may have an angle (α) of axis distortion (P-r) of the fast axis 130a of the optical film with respect to the absorption axis 110a of the polarizer 110 of about +0.03° or greater and less than about +0.2°. When the optical film has an angle of axis distortion (P-r) of the fast axis of the optical film with respect to the absorption axis of the polarizer of about +0.03° or greater and less than about +0.2°, the polarizing plate can exhibit good polarization efficiency, and a liquid crystal display apparatus including the polarizing plate can exhibit a good contrast ratio. For example, the optical film may have an angle of axis distortion of the fast axis of the optical film with respect to the absorption axis of the polarizer of about +0.03° to about +0.15°, about +0.04° to about +0.15°, or, for example +0.03°, +0.04°, +0.05°, +0.06°, +0.07°, +0.08°, +0.09°, +0.10°, +0.11°, +0.12°, +0.13°, +0.14° or +0.15°. Generally, when the optical film is stacked on the polarizer, it is advantageous (or necessary) to have no (or substantially no) axis distortion therebetween for suitable (or maximum) polarization efficiency. In addition, when the polarizing plate has suitable (or maximum) polarization efficiency, a liquid crystal display apparatus including the polarizing plate can exhibit a suitable (or maximum) contrast ratio. According to embodiments of the invention, the liquid crystal display panel can exhibit improved front and/or lateral polarization efficiency and contrast ratio through control of such axis distortion.

Next, a method of preparing a polarizing plate according to one embodiment of the invention will be described. According to one embodiment of the invention, a method of preparing a polarizing plate may include: preparing a polyester film by concurrent (e.g., simultaneous) elongation of a melt-extruded polyester resin in the machine and transverse directions in a ratio of elongation ratio in the machine direction to elongation ratio in the transverse direction of about 1:0.8 to about 1:1.2; and bonding the polyester film to a surface (e.g., an upper side) of a polarizer.

Although the ratio of elongation ratio in the machine direction to elongation ratio in the transverse direction ranges from about 1:0.8 to about 1:1.2, if the polyester film is prepared by sequential elongation in the machine direction and in the transverse direction, or vice versa, the polarizing plate including the polyester film can exhibit rainbow spots due to difficulty in controlling the index of refraction and phase difference. In addition, even though the polyester film is prepared by concurrent (e.g., simultaneous) elongation in the machine and transverse directions, if the ratio of elongation ratio in the machine direction to elongation ratio in the transverse direction is not within one of the above ranges, the polarizing plate including the polyester film can exhibit rainbow spots, thus deteriorating the image quality of the liquid crystal display apparatus. The polyester film may have an elongation ratio of about 1 to about 4 in the machine direction, and an elongation ratio from about 1 to about 4 in the transverse direction.

Because the index of refraction and phase difference of the polyester film can be easily controlled through concurrent (e.g., simultaneous) elongation in the machine and transverse directions, the polarizing plate including the polyester film does not exhibit rainbow spots (or an amount or likelihood of such spots is reduced).

Elongation of the polyester film may be performed using dry elongation and/or wet elongation at a temperature of about $(Tg-20)°$ C. to about $(Tg+50)°$ C. based on the Tg of the polyester resin of the polyester film. For example, elongation of the polyester film may be performed at a temperature of about 70° C. to about 150° C., about 80° C. to about 130° C., about 90° C. to about 120° C., or, for example, about 90, 100, 110 or 120° C. Elongation of the polyester film may be performed any suitable number of times, and may be performed a plurality of times, provided that the polyester film has elongation ratios as described herein.

The polarizer may be prepared by dyeing a polyvinyl alcohol film with iodine or a dichroic dye, followed by elongation in a certain (or set) direction, but the polarizer is not limited thereto. Processes for preparing the polarizer may be any suitable processes commonly used in the art.

The polyester film may be bonded to the polarizer using any suitable method commonly used in the art, and a bonding agent for such a method may include water-based bonding agents, pressure-sensitive bonding agents, and/or photocurable bonding agents, but the bonding agent is not limited thereto.

According to embodiments, the method may further include bonding an optical film to another surface (e.g., a lower side) of the polarizer, and the bonding agent for bonding the optical film may include water-based bonding agents, pressure-sensitive bonding agents, and/or photocurable bonding agents, but the bonding agent is not limited thereto. For example, when the polarizer is placed above the optical film, as shown in FIG. 2, and bonded to the polarizer, the optical film may be bonded to the polarizer such that the angle of axis distortion of the fast axis of the optical film with respect to the absorption axis of the polarizer is about +0.03° or greater and less than +0.2°.

Figure 3:
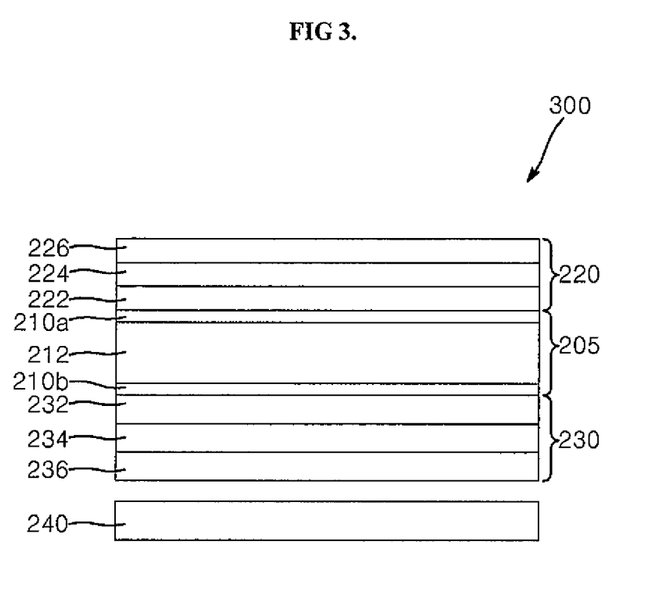
FIG. 3 is a cross-sectional view of a module for a liquid crystal display apparatus according to one embodiment of the present invention.

According to one embodiment of the invention, a liquid crystal display apparatus may include a module for a liquid crystal display apparatus including the polarizing plate according to embodiments of the invention. Next, a module for a liquid crystal display apparatus according to one embodiment of the invention will be described with reference to FIG. 3. FIG. 3 is a cross-sectional view of a module for a liquid crystal display apparatus according to one embodiment of the present invention.

Referring to FIG. 3, a module 300 for a liquid crystal display apparatus according to one embodiment may include: a liquid crystal display panel 205; a first polarizing plate 220 on (or formed on) a first surface (e.g., an upper surface) of the liquid crystal display panel 205; and a second polarizing plate 230 on (or formed on) a second surface (e.g., a lower surface) of the liquid crystal display panel 205 and placed between the liquid crystal display panel 205 and a light source 240. The first polarizing plate 220 may include a first optical film 222 on (or formed on) the first surface (e.g., the upper surface) of the liquid crystal display panel 205, a first polarizer 224 on (or formed on) a surface (e.g., an upper surface) of the first optical film 222, and a first polyester film 226 on (or formed on) a surface (e.g., an upper surface) of the first polarizer 224. The second polarizing plate 230 may include a second optical film 232 on (or formed on) a second surface (e.g., a lower surface) of the liquid crystal display panel 205, a second polarizer 234 on (or formed on) a surface (e.g., a lower surface) of the second optical film 232, and a second polyester film 236 on (or formed on) a surface (e.g., a lower surface) of the second polarizer 234. The first and/or second polarizing plate(s) 220, 230 may be the polarizing plate described above according to one embodiment of the invention.

The liquid crystal display panel 205 may include a liquid crystal panel including a liquid crystal cell layer 212 sealed between first and second substrates 210a, 210b. The first polarizing plate is stacked on one surface of the first substrate, and the second polarizing plate is stacked on one surface of the second substrate. In one embodiment, the first substrate may be a color filter (CF) substrate (upper substrate), and the second substrate may be a thin film transistor (TFT) substrate (lower substrate), but the first and second substrates are not limited thereto.

The first and second substrates may be the same or different, and may each independently be a glass substrate or a plastic substrate, but the first and second substrates are not limited thereto. Examples of suitable plastic substrates include polyethylene terephthalate (PET), polycarbonate (PC), polyimide (PI), polyethylene naphthalate (PEN), polyether sulfone (PES), polyacrylate (PAR), and cycloolefin copolymer (COC) substrates, which can be applied to flexible displays, but the plastic substrate is not limited thereto.

The liquid crystal cell layer may include vertical alignment (VA) mode, in-place switching (IPS) mode, fringe field switching (FFS) mode, or twisted nematic (TN) mode crystals, but the liquid crystal cell layer is not limited thereto.

Hereinafter, the present invention will be described in more detail with reference to some examples. However, it should be noted that these examples are provided for illustration only and are not to be construed in any way as limiting the present invention.

The components used in the Examples and Comparative Examples are as follows:

(1) Polarizer: Polyvinyl alcohol film (VF-PS6000, available from Kuraray Co., Ltd., Japan; thickness: 60 μm)

(2) Polyester film: Polyethylene terephthalate film (COSMOSHINE TA015, available from Toyobo CO., Ltd.; thickness: 100 μm; haze: less than 1%)

(3) Optical film: Triacetyl cellulose film (KC4DR-1, available from Fuji Co., Ltd., Japan; thickness: 40 μm)

EXAMPLES 1 TO 4

A polarizer was prepared by dyeing a material for a polarizer, followed by elongation, and the like. Specifically, after a polyvinyl alcohol film was elongated to a length of 3 times its initial length at 60° C., iodine was adsorbed onto the polyvinyl alcohol film, followed by elongation to a length of 2.5 times the length of the elongated film in a boric acid solution of 40° C., thereby preparing a polarizer. According to the conditions listed in Table 1, after concurrent (e.g., simultaneous) dry elongation of a polyethylene terephthalate film at 100° C., the polyethylene terephthalate film was stacked on an upper surface of the polarizer using a bonding agent, followed by stacking an optical film on a lower surface of the polarizer using a bonding agent, thereby preparing a polarizing plate.

COMPARATIVE EXAMPLES 1 TO 4

A polarizing plate was prepared as in Example 1 except that the conditions for elongation of the polyethylene terephthalate film were as indicated in Table 1.

COMPARATIVE EXAMPLE 5

A polarizing plate was prepared as in Example 1 except that the angle of axis distortion was 0°.

The polarizing plates prepared in the Examples and Comparative Examples were evaluated as to the following properties. The results are shown in Table 2.

TABLE 1

|  | Conditions of elongation | | | Angle of axis distortion (°)* | Re (nm) | Rth (nm) | NZ |
| --- | --- | --- | --- | --- | --- | --- | --- |
|  | Order of elongation | Elongation ratio in MD | Elongation ratio in TD |  |  |  |  |
| Example 1 | Concurrent (or Simultaneous) elongation in MD and TD | 3.1 | 3.3 | +0.11 | 500 | 9800 | 20.1 |
| Example 2 | Concurrent (or Simultaneous) elongation in MD and TD | 3.1 | 3.2 | +0.08 | 200 | 6800 | 34.5 |
| Example 3 | Concurrent (or Simultaneous) elongation in MD and TD | 2.9 | 2.9 | +0.05 | 0 | 4200 | no limit |
| Example 4 | Concurrent (or Simultaneous) elongation in MD and TD | 2.6 | 2.6 | +0.05 | 0 | 1000 | no limit |
| Comparative Example 1 | Elongation in MD, followed by elongation in TD | 2.5 | 2.5 | +0.22 | 1320 | 13200 | 10.5 |
| Comparative Example 2 | Elongation in TD, followed by elongation in MD | 2.7 | 2.8 | +0.27 | 1900 | 15800 | 8.8 |
| Comparative Example 3 | Concurrent (or Simultaneous) elongation in MD and TD | 2.5 | 3.4 | +0.33 | 4250 | 14500 | 3.9 |
| Comparative Example 4 | Concurrent (or Simultaneous) elongation in MD and TD | 1.8 | 3.5 | +0.41 | 5400 | 16500 | 3.6 |
| Comparative Example 5 | Concurrent (or Simultaneous) elongation in MD and TD | 3.1 | 3.3 | 0 | 500 | 9800 | 20.1 |

*Angle of axis distortion: The angle of axis distortion of the fast axis of the optical film with respect to the absorption axis of the polarizer when the optical film is bonded to a lower surface of the polarizer.

TABLE 2

| | Polarization efficiency (%) | Difference in polarization efficiency (%) | CR | CRO (%) | Rainbow spots Front | Rainbow spots Lateral |
|---|---|---|---|---|---|---|
| Example 1 | 99.992 | 0.004 | 5,131 | 4.86 | X | X |
| Example 2 | 99.995 | 0.007 | 5,227 | 6.83 | X | X |
| Example 3 | 99.997 | 0.009 | 5,241 | 7.11 | X | X |
| Example 4 | 99.997 | 0.009 | 5,244 | 7.17 | X | X |
| Comparative Example 1 | 99.981 | −0.007 | 4,844 | −1.00 | ⊚ | ⊚ |
| Comparative Example 2 | 99.974 | −0.014 | 4,301 | −12.10 | ⊚ | ⊚ |
| Comparative Example 3 | 99.961 | −0.027 | 3,967 | −18.92 | ○ | ⊚ |
| Comparative Example 4 | 99.956 | −0.032 | 3,642 | −25.57 | Δ | ○ |
| Comparative Example 5 | 99.988 | — | 4,893 | — | X | X |

(1) Retardation: The in-plane retardation (Re) and out-of-plane retardation (Rth) of the polyethylene terephthalate film at a wavelength of 550 nm were measured using an Axo Scan device (available from Axometrics Co., Ltd.) and calculated by Equations 1 and 2 (described above).

(2) Rainbow spots: The polarizing plates were assembled to a liquid crystal display panel including VA mode liquid crystals. The polarizing plates were assembled such that the optical films were disposed to contact the upper and lower surfaces of the liquid crystal display panel. Using an SR-3A spectroradiometer (available from Topcon Co., Ltd.), the presence of rainbow spots formed on a front side of the panel (direction of a viewing angle of 90°) and on a lateral side thereof (direction of a viewing angle of 45° or 135°) were investigated. No rainbow spots, slight rainbow spots, moderate rainbow spots, and severe rainbow spots are indicated as X, Δ, ○ and ⊚, respectively.

(3) Angle of axis distortion and polarization efficiency: The angle of axis distortion between the absorption axis of the polarizer and the fast axis of the optical film was measured using an Axoscan device, and polarization efficiency was measured using a Jasco V7100 device (available from JASCO International Co., Ltd.). Specifically, specimens having a size of 50 mm×50 mm (length×width) were taken from the polarizing plate in the machine direction. After the specimen was positioned such that light was first incident upon a surface of the optical film, polarization efficiency was measured using the Jasco V7100, and axis distortion between the absorption axis of the polarizer and the fast axis of the optical film was measured using the Axoscan. The difference in polarization efficiency was calculated using the specimen of Comparative Example 5 (having no axis distortion) as a reference.

(4) Contrast ratio: The prepared polarizing plate was attached to a 32-inch liquid crystal panel (an LTA320AP02 panel, available from Samsung Electronics Co., Ltd.), followed by measurement of the contrast ratio using an SR-3A luminance meter (available from Topcon Co., Ltd.). The Contrast Ratio (CR) is the value measured when the polarizing plate was mounted on the liquid crystal panel, and the CRO is a calculated value based on the contrast ratio of the specimen of Comparative Example 5 as a reference. That is, the CRO is a percentage difference from the CR of the specimen of Comparative Example 5, and is calculated as follows:

CRO=[(measured CR−CR of Comp. Ex. 5)/(CR of Comp. Ex. 15]×100.

As shown in Table 1, the polarizing plates prepared in the examples according to embodiments of the invention did not exhibit both front and lateral rainbow spots. Thus, the examples according to embodiments of the invention provided polarizing plates that included the elongated polyethylene terephthalate film as a protective film and did not exhibit both front and lateral rainbow spots when mounted on the liquid crystal display panel. In addition, the examples according to embodiments of the present invention provided polarizing plates that exhibited high polarization efficiency and an improved contrast ratio of the liquid crystal display panel through control of axis distortion.

Conversely, in Comparative Examples 1 to 2 (in which the polyester film was not subjected to concurrent (or simultaneous) elongation in the machine and transverse directions despite a ratio of elongation ratio in the machine direction to elongation ratio in the transverse direction satisfying the ranges according to embodiments of the invention), the polarizing plates did not prevent the problem of rainbow spots due to non-uniformity of the elongation ratios. In addition, in Comparative Examples 3 to 4 (in which the polyester film had a ratio of elongation ratio in a machine direction to elongation ratio in a transverse direction outside of the ranges according to the present invention, despite concurrent (or simultaneous) elongation in the machine and transverse directions), the polarizing plates did not prevent the problem of rainbow spots due to birefringence.

While certain embodiments of the present invention have been illustrated and described herein, it will be understood by those of ordinary skill in the art that various modifications, changes, alterations, and equivalent embodiments can be made to the disclosed embodiments without departing from the spirit and scope of the invention as defined by the following claims, and equivalents thereof. Throughout the text and claims, use of the word "about" reflects the penumbra of variation associated with measurement, significant figures, and interchangeability, all as understood by a person having ordinary skill in the art to which this disclosure pertains. Additionally, throughout this disclosure and the accompanying claims, it is understood that even those ranges that may not use the term "about" to describe the high and low values are also implicitly modified by that term, unless otherwise specified.

What is claimed is:
1. A polarizing plate comprising:
a polarizer; and
a polyester film on a surface of the polarizer, and
an optical film on an other surface of the polarizer, the optical film having an angle of axis distortion of a fast axis of the optical film with respect to an absorption axis of the polarizer of about +0.03° or greater and less than about +0.2°;
the polyester film having a ratio of an elongation ratio in a machine direction to an elongation ratio in a transverse direction of about 1:0.8 to about 1:1.2, an in-plane retardation (Re) of about 500 nm or less at a wavelength of 550 nm as calculated by Equation 1, and an out-of-plane retardation (Rth) of about 1,000 nm to about 10,000 nm at a wavelength of 550 nm as calculated by Equation 2:

$$Re = (nx - ny) \times d \quad \text{Equation 1}$$

$$Rth = ((nx + ny)/2 - nz) \times d \quad \text{Equation 2}$$

wherein mc is a refractive index at a wavelength of 550 nm in an x-axis direction of the polyester film, ny is a refractive index of the polyester film at a wavelength of 550 nm in a y-axis direction of the polyester film, nz is a refractive index at a wavelength of 550 nm in a z-axis direction of the polyester film, and d is a thickness of the polyester film in nm.

2. The polarizing plate according to claim 1, wherein the ratio of the elongation ratio in the machine direction to the elongation ratio in the transverse direction of the polyester film is about 1:1.

3. The polarizing plate according to claim 1, wherein the polyester film has a degree of biaxiality (NZ) of about 1 or greater as represented by Equation 3:

$$NZ=(nx-nz)/(nx-ny) \qquad \text{Equation 3}$$

wherein nx is the refractive index at a wavelength of 550 nm in the x-axis direction of the polyester film, ny is the refractive index of the polyester film at a wavelength of 550 nm in the y-axis direction of the polyester film, and nz is the refractive index at a wavelength of 550 nm in the z-axis direction of the polyester film.

4. The polarizing plate according to claim 1, wherein the polyester film has a difference of nx−ny of about 0 to about 0.1, and the polyester film has a degree of biaxiality (NZ) of about 15 or greater as represented by Equation 3:

$$NZ=(n-nz)/(nx-ny) \qquad \text{Equation 3}$$

wherein nx is the refractive index at a wavelength of 550 nm in the x-axis direction of the polyester film, ny is the refractive index of the polyester film at a wavelength of 550 nm in the y-axis direction of the polyester film, and nz is the refractive index at a wavelength of 550 nm in the z-axis direction of the polyester film.

5. The polarizing plate according to claim 1, wherein the polyester film is non-birefringent.

6. The polarizing plate according to claim 1, wherein the polyester film comprises polyethylene terephthalate, polybutylene terephthalate, polyethylene naphthalate, and/or polybutylene naphthalate resins.

7. The polarizing plate according to claim 1, wherein the optical film is a retardation film.

8. The polarizing plate according to claim 1, wherein the optical film comprises cellulose, polyester, cyclic polyolefin, polycarbonate, polyether sulfone, polysulfone, polyamide, polyimide, polyolefin, polyacrylate, polyvinyl alcohol, polyvinyl chloride, and/or polyvinylidene chloride resins.

9. A liquid crystal display apparatus comprising the polarizing plate according to claim 1.

10. A method of preparing a polarizing plate, comprising:
preparing a polyester film by concurrent elongation of a melt-extruded polyester resin in machine and transverse directions in a ratio of an elongation ratio in a machine direction to an elongation ratio in a transverse direction of about 1:0.8 to about 1:1.2;
bonding the polyester film to a surface of a polarizer; and
bonding an optical film to an other surface of the polarizer, the optical film being bonded to the polarizer such that an angle of axis distortion of a fast axis of the optical film with respect to an absorption axis of the polarizer is about +0.03° or greater and less than about +0.2°.

11. The method according to claim 10, wherein the polyester film has an in-plane retardation (Re) of about 500 nm or less at a wavelength of 550 nm as represented by Equation 1, and an out-of-plane retardation (Rth) of about 10,000 nm or less at a wavelength of 550 nm as represented by Equation 2:

$$Re=(nx-ny)\times d \qquad \text{Equation 1}$$

$$Rth=((nx+ny)/2-nz)\times d \qquad \text{Equation 2}$$

wherein nx is a refractive index at a wavelength of 550 nm in an x-axis direction of the polyester film, ny is a refractive index of the polyester film at a wavelength of 550 nm in a y-axis direction of the polyester film, nz is a refractive index at a wavelength of 550 nm in a z-axis direction of the polyester film, and d is a thickness of the film in nanometers.

12. The method according to claim 10, wherein the polyester film has a degree of biaxiality (NZ) of 15 or greater as represented by Equation 3:

$$NZ=(nx-nz)/(nx-ny) \qquad \text{Equation 3}$$

wherein nx is a refractive index at a wavelength of 550 nm in an x-axis direction of the polyester film, ny is a refractive index of the polyester film at a wavelength of 550 nm in a y-axis direction of the polyester film, and nz is a refractive index at a wavelength of 550 nm in a z-axis direction of the polyester film.

13. The method according to claim 10, wherein the polyester resin comprises polyethylene terephthalate, polybutylene terephthalate, polyethylene naphthalate, and/or polybutylene naphthalate.

14. The method according to claim 10, wherein the ratio of the elongation ratio in the machine direction to the elongation ratio in the transverse direction of the polyester film is about 1:1.

* * * * *